(12) United States Patent
Mukai

(10) Patent No.: US 9,545,826 B2
(45) Date of Patent: Jan. 17, 2017

(54) PNEUMATIC TIRE

(71) Applicant: Sumitomo Rubber Industries, Ltd., Kobe-shi, Hyogo (JP)

(72) Inventor: Tomoyuki Mukai, Kobe (JP)

(73) Assignee: Sumitomo Rubber Industries, Ltd., Kobe-shi (JP)

( * ) Notice: Subject to any disclaimer, the term of this patent is extended or adjusted under 35 U.S.C. 154(b) by 664 days.

(21) Appl. No.: 13/960,016

(22) Filed: Aug. 6, 2013

(65) Prior Publication Data

US 2014/0174623 A1 Jun. 26, 2014

(30) Foreign Application Priority Data

Dec. 26, 2012 (JP) ................................. 2012-283374

(51) Int. Cl.
*B60C 13/00* (2006.01)
*B60C 13/02* (2006.01)

(52) U.S. Cl.
CPC ............ *B60C 13/02* (2013.01); *B60C 13/003* (2013.01)

(58) Field of Classification Search
CPC ......... B60C 13/00; B60C 13/001; B60C 13/02
See application file for complete search history.

(56) References Cited

FOREIGN PATENT DOCUMENTS

| EP | 0 738 617 A2 | 10/1996 |
|----|----|----|
| JP | 7-164831 | * 6/1995 |
| JP | H08-282219 A | 10/1996 |
| JP | 8-318716 | * 12/1996 |
| JP | 2003-252011 A | 9/2003 |
| JP | 2003-320818 A | 11/2003 |
| JP | 2004-17829 A | 1/2004 |

OTHER PUBLICATIONS

Machine translation of JP 8-318716, 1996.*
Machine translation of JP 7-164831, 1995.*

* cited by examiner

*Primary Examiner* — Justin Fischer
(74) *Attorney, Agent, or Firm* — Birch, Stewart, Kolasch & Birch, LLP

(57) ABSTRACT

A pneumatic tire comprises at least one sidewall portion provided with a serration pattern on its outer surface, the serration pattern comprising a plurality of first groups being repeatedly arranged in the circumferential direction of the tire, each first group comprising a plurality of ridges which are arranged using gradually increasing pitches toward a first circumferential direction of the tire, wherein a region provided with the serration pattern on the outer surface of the sidewall portion has a radius of curvature in a range of not more than 70 mm in a cross section including a tire axis under a standard condition such that the tire is mounted on a standard rim and inflated to a standard pressure, but no tire load is loaded.

7 Claims, 4 Drawing Sheets

PNEUMATIC TIRE

BACKGROUND OF THE INVENTION

Field of the Invention

The present invention relates to a pneumatic tire having a serration pattern for improving its sidewall appearance so that observers do not notice molding defects such as a dent or a bulge thereon.

Description of the Related Art

Conventionally, a pneumatic tire comprises a pair of sidewall portions each usually with a serration pattern on its outer surface. The serration pattern comprises a plurality of radially extending ridges of similar cross sectional shape. The ridges are arranged a circumferential direction of the tire in substantially parallel each other. The serration pattern helps to improve sidewall appearance directly or indirectly by offering complicated reflected light so that observers do not notice molding defects such as a dent or a bulge on the sidewall portions. Additionally, the serration pattern helps to improve visibility of other branded trademark provided on the serration pattern such as characters, numerical or figures.

Pneumatic tires with various serration patterns mentioned above are disclosed in Japanese patent application laid-open Nos. 2003-252011 and 2003-320818, for example. These documents disclose a serration pattern which comprises an eccentric-serration region having a plurality of ridges each of which extends from an eccentricity center deviated from a tire axis.

Japanese patent application laid-open No. 2004-17829 also discloses a serration pattern which includes two different types of radially inner and outer ridges.

However, conventional serrations patterns of tires mentioned above had plenty of room for improvement in order to improve sidewall appearance of tires that have a thinner sidewall rubber for weight saving.

SUMMARY OF THE INVENTION

The present invention has been worked out in light of the circumstances described above, and has a main object of providing a pneumatic tire having an improved serration pattern for improving its sidewall appearance.

In accordance with the present invention, there is provided a pneumatic tire having a pair of sidewall portions, which comprises at least one of sidewall portions provided with a serration pattern on its outer surface, the serration pattern comprising a plurality of radially extending ridges being arranged in a circumferential direction of the tire, the serration pattern including a plurality of first groups being repeatedly arranged in the circumferential direction of the tire, each first group comprising a plurality of ridges which are arranged using gradually increasing pitches toward a first circumferential direction of the tire, wherein a region provided with the serration pattern on the outer surface of the sidewall portion has a radius of curvature in a range of not more than 70 mm in a cross section including a tire axis under a standard condition such that the tire is mounted on a standard rim and inflated to a standard pressure, but no tire load is loaded.

Preferably, when each pitch between two ridges is identified as a central angle between two tire-radii which pass through two ridges, viewed from a side of the tire, the first group includes a minimum pitch of pitches in a range of from 0.2 to 0.3 degrees and a maximum pitch of pitches in a range of more than 0.3 degrees but not more than 0.6 degrees, and the difference between adjacent pitches in the first group is in a range of from 0.07 to 0.14 degrees.

Preferably, each first group includes at least three kinds of said pitches.

Preferably, each of ridges has an inclination angle in a range of not more than 5 degrees with respect to a radial direction of the tire.

Preferably, the outer surface of the sidewall portion is formed of a sidewall rubber element having a thickness in a range of not more than 2.5 mm at a tire maximum-width position under the standard state, and the serration pattern is provided in an area including the tire maximum-width position.

Preferably, the tire further comprises a pair of bead portions each with a bead core therein and a carcass comprising at least one carcass ply which comprises a main portion extending between bead cores and a pair of turn-up portion each turned up around the bead core from axially inside to outside of the tire, and radially outer ends of turn-up portions are positioned axially inside the serration pattern.

Preferably, radially outer ends of turn-up portions mentioned above are located radially outward than a tire maximum-width position of the tire under the standard state.

Preferably, an area of the outer surface of the serration pattern has a central angle in a range of not less than 40 degrees.

DETAILED DESCRIPTION

An embodiment of the present invention will be explained below with reference to the accompanying drawings.

Figure 1:
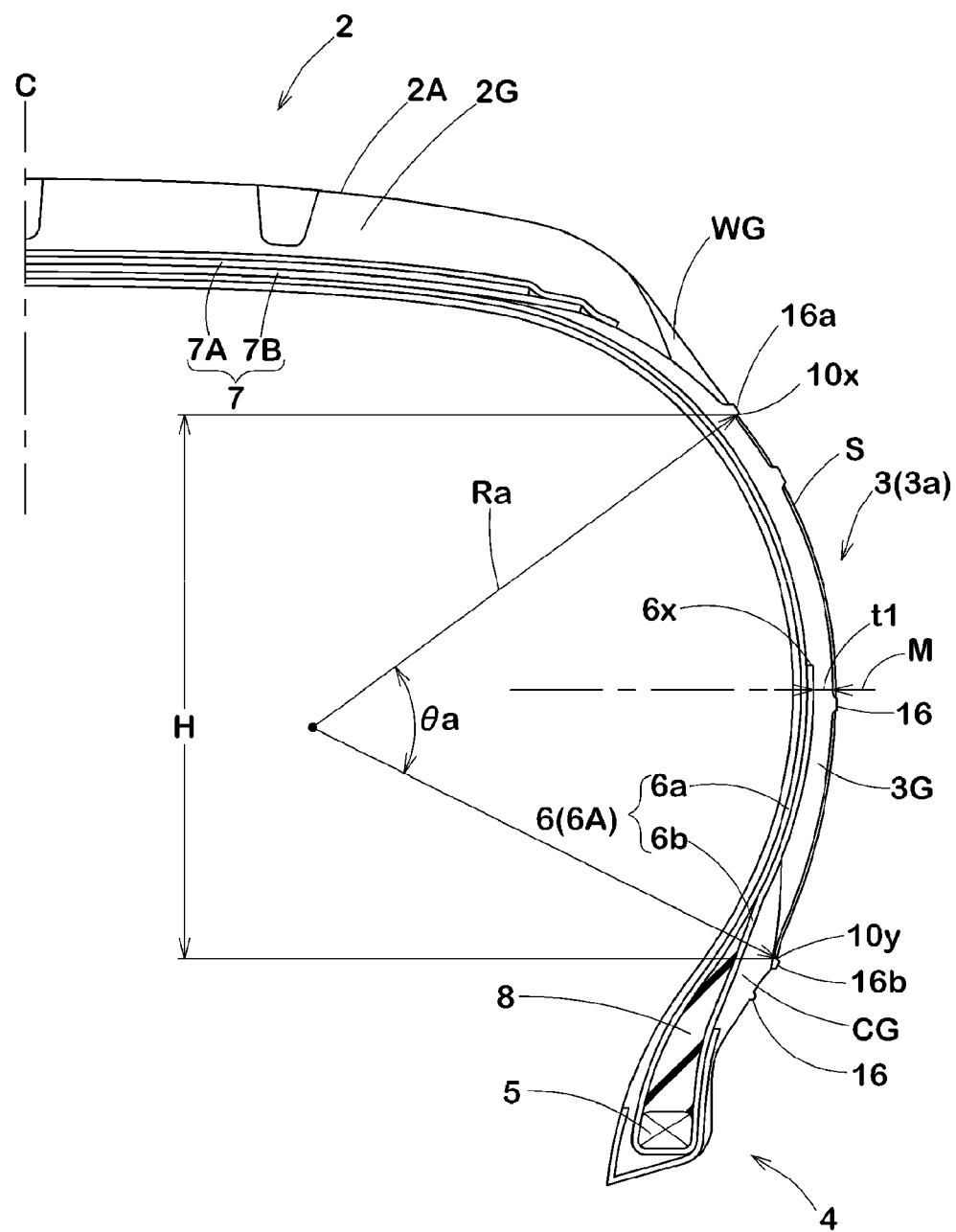
FIG. 1 is a right side cross sectional view of a pneumatic tire showing an embodiment of the present invention.

FIG. 1 shows a pneumatic tire 1 in accordance with the present embodiment, in a tire meridian section including a tire axis CL (shown in FIG. 3) under a standard condition. Here, the standard condition is such that the tire 1 is mounted on a standard wheel rim (not shown) and is inflated to a standard pressure but loaded with no tire load. In this application including specification and claims, various dimensions, positions and the like of the tire refer to those under the standard condition of the tire unless otherwise noted.

The standard wheel rim is a wheel rim officially approved or recommended for the tire by standards organizations, the standard wheel rim is the "standard rim" specified in JATMA, the "measuring Rim" in ETRTO, the "Design Rim" in TRA or the like, for example.

The standard pressure is the "maximum air pressure" in JATMA, the "Inflation Pressure" in ETRTO, and the maximum pressure given in the "Tire Load Limits at various Cold Inflation Pressures" table in TRA or the like. In case of passenger car tires, however, the standard pressure is uniformly defined by 180 kPa.

As shown in FIG. 1, the tire 1 in accordance with the present embodiment comprises: a tread portion 2; a pair of sidewall portions 3 each of which extends radially inward from the axially outer end of the tread portion 2; and a pair of bead portions 4 each of which is provided radially inside the sidewall portion 3 and has a bead core 5 therein. The tire 1, for example, is illustrated as a passenger car tire. However, the present invention is not particularly limited to the passenger car tire, other kinds of tires such as a heavy-duty tire may be adopted.

The tire 1 also comprises: a carcass 6 extending between bead cores 5 through the tread portion 2 and sidewall portions 3; a belt layer 7 disposed radially outwardly of the carcass 6 in the tread portion 2; a pair of sidewall rubber elements 3G each of which is disposed axially outwardly of the carcass 6 to form an outer surface of the sidewall portion 3; a tread rubber element 2G disposed radially outwardly of the belt layer 7 to form a tread contact surface 2A for contacting on the ground; a pair of wing rubber elements WG each covering the axially outer end of the tread rubber element 2G; and a pair of clinch rubber elements CG in the bead portions 4.

The carcass 6 comprises at least one ply 6A of carcass cords which comprises a main portion 6a extending between bead cores 5, 5 through the tread portion 2 and sidewall portions 3, and a pair of turn-up portions 6b each turned up around the bead core 5 from axially inside to outside of the tire. The carcass cords are arranged at an angle in a range of from 75 to 90 degrees with respect to a tire equator C. A bead apex rubber element 8 which extends and tapers radially outwardly of the tire from the bead core 5 is provided between the main portion 6a and the turn-up portion 6b in each bead portion 4.

In this embodiment, the carcass 6 has a high turn-up structure that has a radially outer end 6x of the turn-up portion 6b being positioned higher than a tire maximum-width position M. Here, the tire maximum width position M is defined as a radial position of the tire where the main portion 6a of the carcass ply 6A protrudes axially outermost of the tire under the standard condition mentioned-above. Since such a tire 1 has high rigidity at the tire maximum-width position M which is subjected to large tire load during traveling, weight saving is achieved as well as high durability of the tire.

The belt layer 7 comprises two belt plies 7A, 7B of steel cords laid at an angle of from 15 to 40 degrees with respect to the tire equator C so that each steel cord of plies is crossed.

The sidewall rubber element 3G preferably has a thickness t1 in a range of not more than 2.5 mm at the tire maximum-width position M in order to save tire weight. When the thickness t1 is too small, durability of the tire is liable to deteriorate. From this point of view, the thickness t1 is preferably in a range of from not less than 2.0 mm.

Figure 2:
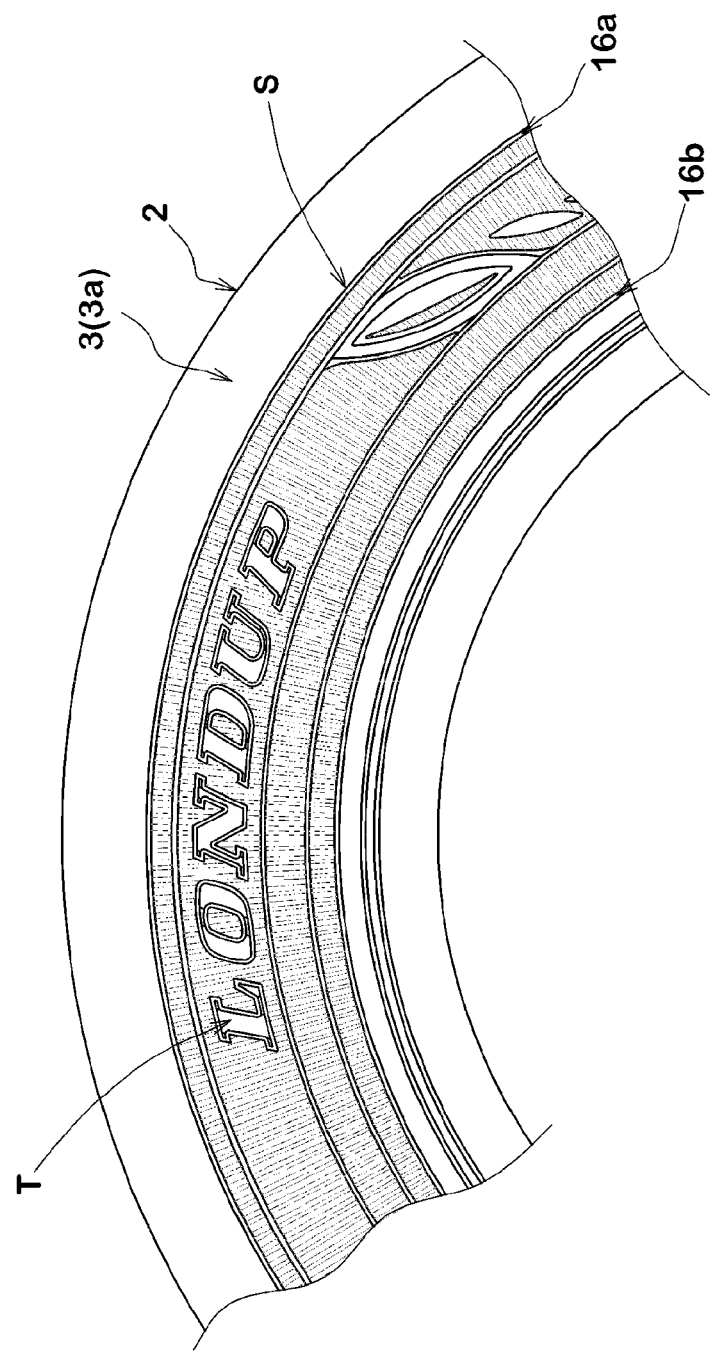
FIG. 2 is a side view of the tire of FIG. 1.
Figure 3:
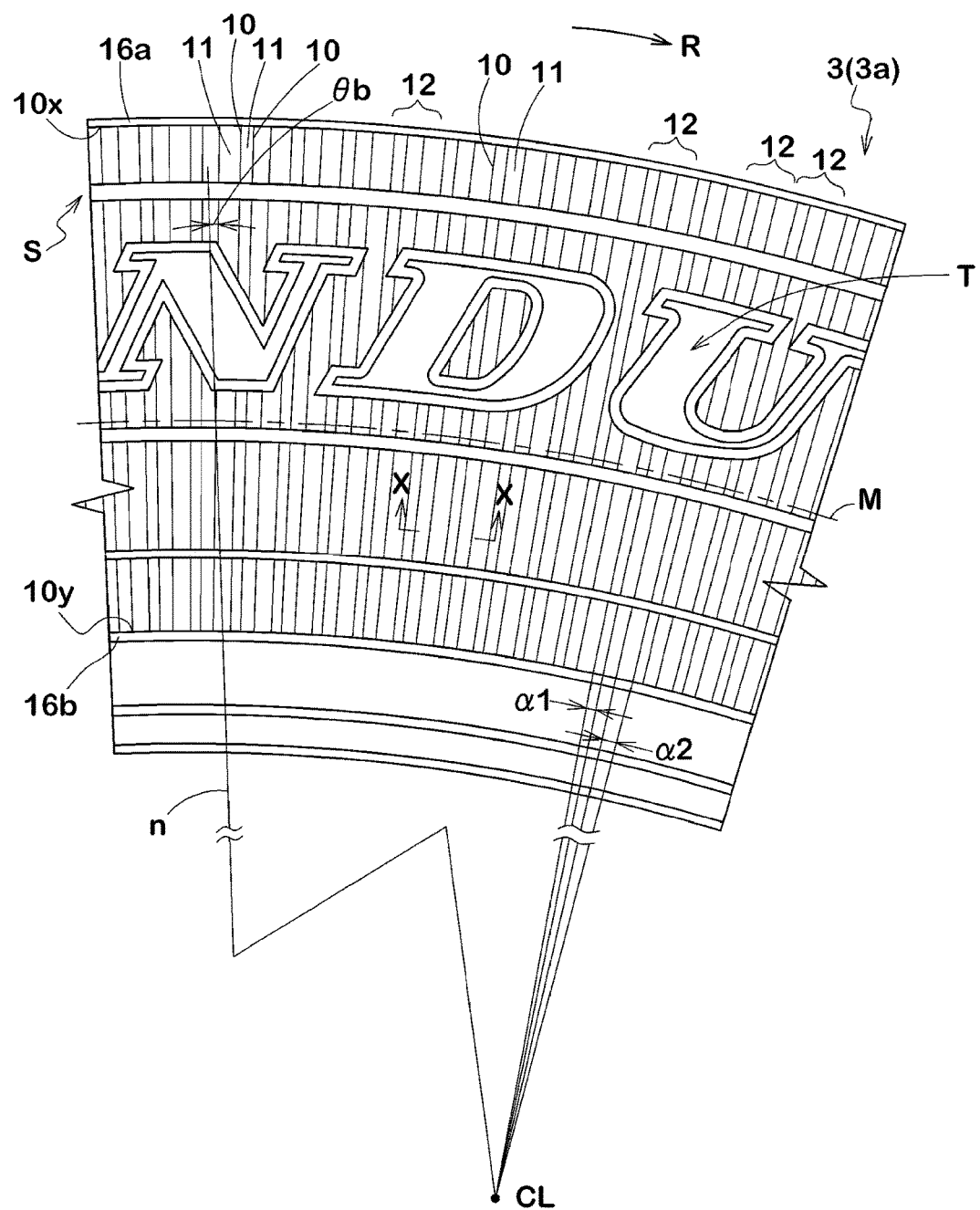
FIG. 3 is a partial enlarged view of a serration pattern of FIG. 2.
Figure 4:
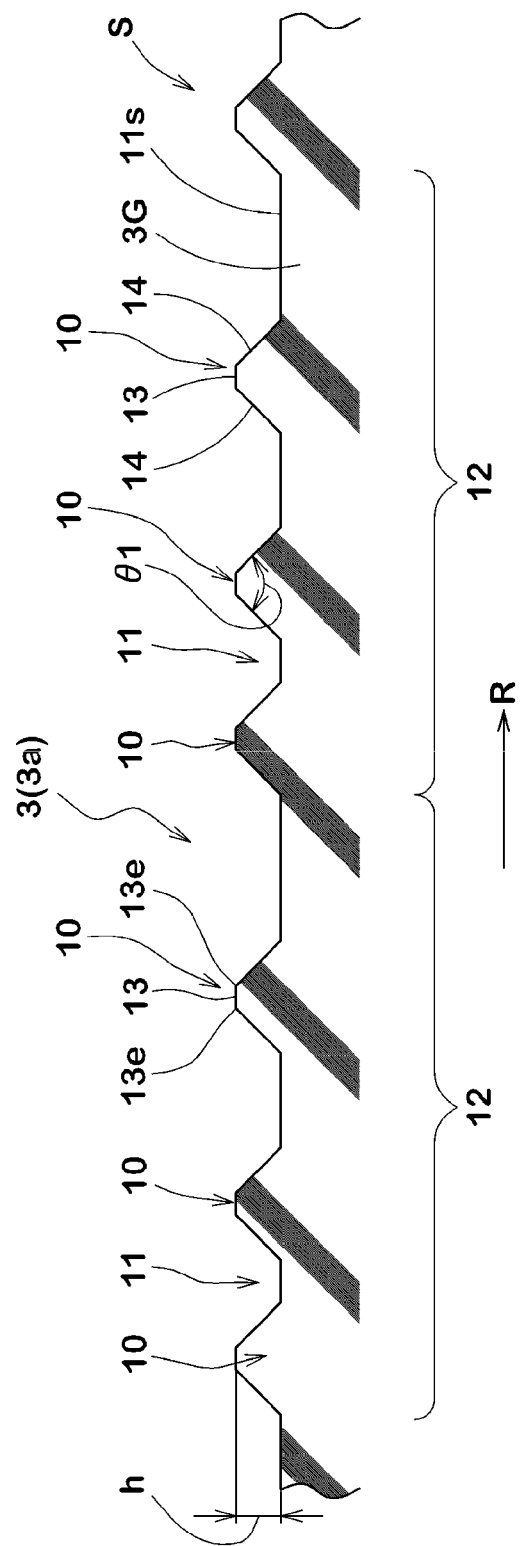
FIG. 4 is a cross sectional view taken along a line x-x of FIG. 3.

FIG. 2 shows a side view of the tire in accordance with the present invention, FIG. 3 is a partial enlarged view of FIG. 2, and FIG. 4 is a cross sectional view taken along a line x-x of FIG. 3. Referring to FIGS. 2 to 4, at least one of sidewall portions 3 is provided with a serration pattern S on its outer surface 3a. The serration pattern S comprises a plurality of radially extending ridges 10 being arranged in a circumferential direction of the tire and a plurality of slot 11 provided therebetween. In FIGS. 2 to 3, each ridge 10 is shown as a single line, and each slot 11 is shown as a blank therebetween.

In this embodiment, both of sidewall portions 3 have serration patterns S. Such serration patterns S help to improve visibility of the branded trademark T provided on the serration pattern S such as characters in this embodiment.

In this embodiment, the serration pattern S continuously extends in the circumferential direction of the tire so as to form a ring shape. The serration pattern S may partially extend in the circumferential direction of the tire so as to form an arc shape (not shown).

In this embodiment, the serration pattern S has an area in a range of more than 90% the outer surface of the sidewall portion 3 in order to further improve visibility of the branded trademark T. Referring to FIG. 1, the serration pattern is provided between a radially outmost rib 16a and a radially innermost rib 16b. The radially outermost rib 16a continuously extends in the circumferential direction of the tire at radially inward of the wing rubber element WG. The radially innermost rib 16b continuously extends in the circumferential direction of the tire on the clinch rubber element CG.

Referring to FIG. 4, the serration pattern S includes a plurality of first groups 12 being repeatedly arranged in the circumferential direction of the tire. Each first group 12 comprises a plurality of ridges 10 which are arranged using gradually increasing pitches toward a first circumferential direction R of the tire.

In each first group 12, a region having ridges 10 arranged in relatively small pitches reflects less light due to narrow slots 11 therebetween. Therefore, the area mentioned above is observed as dark. On the other hand, a region having ridges 10 arranged in relatively large pitches in each first group 12, reflects much light due to wide slots 11 therebetween. Therefore, the area mentioned above is observed as bright. Accordingly, since the serration pattern S including repeated first groups 12 provides observers with a gradation of reflected light which is gradually changing in the circumferential direction of the tire, complicated reflected light from the serration pattern S is emphasized so that observers do not notice molding defects such as a dent or a bulge on the sidewall portions 3. Therefore, sidewall appearance of tires is further improved.

In this embodiment, each ridge 10 has a trapezoid cross section which comprises a top surface 13, a pair of slant surfaces 14 each of which extends from both ends 13e of the top surface 13 to axially inwardly of the tire so that each width of slot 11 is decreasing toward axially inwardly of the tire. Accordingly, the slant surface 14 also helps to reflect light toward observers so that the gradation is more complicated. In order to effectively improve advantage above, an angle $\theta 1$ between two slant surfaces 14, 14 is preferably in a range of from not less than 75 degrees, more preferably not less than 80 degrees, but preferably not more than 105 degrees, more preferably not more than 100 degrees. In other aspects of the present invention, the cross section of the ridge 10 may be a triangular, a rectangular, or a part of sine curve.

Preferably, the ridge 10 has a height h in a range of from 0.2 to 0.6 mm. The height h of the ridge is, for example, measured from the bottom 11s of the slot 11 to the top surface 13 at the tire maximum-width position M (shown in FIG. 3). When the height h of the ridge 10 is too large, the serration pattern S tends to look dark as a whole, whereby an inadequate contrast results so that advantage of the serration pattern S mentioned above is liable to deteriorate. Similarly, when the height h of the ridge 10 is too small, the serration pattern S tends to look bright as a whole, whereby an inadequate contrast results.

Referring to FIG. 3, pitches of each first group 12 preferably include a minimum pitch $\alpha 1$ in a range of from 0.2 to 0.3 degrees. Here, a pitch between two ridges 10 is identified as a central angle between two tire-radii which pass through the two ridges 10, 10, viewed from a side of the tire. When the minimum pitch α1 is less than 0.2 degrees, inadequate contrast on the serration pattern S is caused by too narrow slots. When the minimum pitch α1 is more than 0.3 degrees, inadequate contrast on the serration pattern S is also caused by increasing a brighter area on the serration pattern S. Additionally, in case that the minimum pitch α1 is too large, visibility of the branded trademark T is liable to deteriorate. From the same point of view, the maximum pitch α2 is preferably in a range of from 0.3 to 0.6 degrees.

Preferably, the difference αh between two adjacent pitches is in a range of from 0.07 to 0.14 degrees. When the difference αh of two adjacent pitches is more than 0.14 degrees, visibility of the branded trademark T is liable to deteriorate by increasing a brighter area in the serration pattern S. When the difference αh of two adjacent pitches is less than 0.07 degrees, gradation of reflected light tends to be inadequate.

Preferably, the first group 12 includes at least three kinds of pitches of ridges 10. In this embodiment, three kinds of pitches are included in each first group 12 to effectively provide advantage mentioned above of the invention. Preferably, the first group 12 includes at most six kinds of pitches of ridges 10.

Referring to FIG. 1, a region provided with the serration pattern S on the outer surface 3a of the sidewall portion 3 has a radius Ra of curvature in a range of not more than 70 mm in a cross section including the tire axis CL under the standard condition. Such a tire 1 provides the serration pattern S with a high contrast area in which shadowing or shading has been clearly applied so that observers do not notice molding defects such as a dent or a bulge on the sidewall portion 3. When the radius Ra of curvature of the serration pattern S is too small, not only durability of tire, but also visibility of the serration pattern S is liable to deteriorate. Thus, the radius Ra of curvature of the serration pattern S is preferably in a range of not less than 40 mm. Here, the radius Ra of curvature mentioned above is regarded as a radius of a single arc that passes through three points including the radially outermost point 10x of the ridge 10, the radially innermost point 10y of the ridge 10 and the tire maximum width point M. In case that a circumferentially extending rib 16 is provided at the tire maximum-width point M, the radius Ra of curvature is defined except for the rib 16.

In order to further improve the advantage above, the central angle θa of the region provided with the serration pattern S is preferably in a range of not less than 40 degrees. When the central angle θa is less than 40 degrees, molding defects on the sidewall portion 3 such as a dent or a bulge may no be covered with the serration pattern S. When the central angle θa is more than 75 degrees, visibility of the branded trademark T is liable to deteriorate. From this point of view, the central angle θa of the region provided with serration pattern S is in a range of not more than 70 degrees.

Preferably, radially outer ends 6x of turn-up portions 6b of the carcass ply 6A are positioned within an area being axially inside the serration pattern S. Thus, since the serration pattern S covers with axially outside the outer ends 6x of turn-up portions 6b of the carcass ply 6A where the thickness of sidewall rubber element 3G changes, it may be difficult for observers to notice the thickness change of the sidewall rubber element 3G. Therefore, the serration pattern S in accordance with the present embodiment further improves sidewall appearance. In the same point of view, the serration pattern S is preferably provided so as to include the tire maximum width point M.

In order to further improve advantage mentioned above, the radially outer ends 6x of the turn-up portion 6b is preferably located in a radial distance of 35% to 65% the radial height H of the serration pattern S from the radially outer end 10x of ridges 10.

Referring to FIG. 3, each ridge 10 preferably extends with a small inclination angle θb in a range of not more than 5 degrees with respect to the radial straight line n which passes through the tire axis CL and the intersection between each ridge 10 and the tire maximum-width point M. More preferably, the angle θb is in a range of not more than 4 degrees, still further preferably equal to 0 degree.

The present invention is more specifically described and explained by means of the following Examples and References. It is to be understood that the present invention is not limited to embodiments mentioned above and Examples described later.

Comparison Test

Pneumatic tires with serration patterns shown in FIG. 2 and the same internal structure of FIG. 1 except for details shown in Table 1 were made and tested. Major specification of test tires and test methods are as follows.

Size: 195/65/R15

Thickness of sidewall rubber element:
    At tire maximum-width position: 2.5 mm
    At radially inner end of wing rubber: 3.5 mm
    Total rubber thickness at the maximum thickness point of wing rubber element: 6.0 mm Visibility of Trade Mark and Sidewall Appearance Test:

Each test tire was mounted on the wheel rim of 15×6J with an inner pressure of 230 kPa for checking its sidewall appearance. Five observers checked each test tire mentioned above with the naked eye whether sidewall appearance thereof was excellent or not. Additionally, visibility of trade marks provided on the serration pattern was also checked with the naked eye. The results were indicated shown in Table 1 by a score based on Ref.1 being 100. The larger the score, the better the appearance is.

Test results are shown in Table 1.

From the test results, it was confirmed that visibility of trademarks and sidewall appearance of tires in accordance with the present invention can be effectively improved compared to references. Although the tire having a sidewall rubber element with a thickness of 2.0 mm at the tire maximum-width position was also tested, the same result shown in Table 1 was obtained.

TABLE 1

|  | Ref. 1 | Ref. 2 | Ref. 3 | Ex. 1 | Ex. 2 | Ex. 3 | Ex. 4 | Ex. 5 | Ex. 6 |
| --- | --- | --- | --- | --- | --- | --- | --- | --- | --- |
| Radius Ra of curvature of serration pattern area (mm) | 65 | 65 | 75 | 70 | 65 | 40 | 35 | 65 | 65 |
| Minimum pitch α1 of first group (deg.) | 0.2 | 0.2 | 0.3 | 0.3 | 0.3 | 0.3 | 0.3 | 0.1 | 0.3 |
| Maximum pitch α2 of first group (deg.) | 0.2 | 0.2 | 0.5 | 0.5 | 0.5 | 0.5 | 0.5 | 0.3 | 0.4 |
| Difference αh of adjacent pitches (deg.) | 0 | 0 | 0.1 | 0.1 | 0.1 | 0.1 | 0.1 | 0.1 | 0.05 |
| Inclination angle θb of ridges (deg.) | 10 | 0 | 0 | 0 | 0 | 0 | 0 | 0 | 0 |
| The number of pitch kinds | 1 | 1 | 3 | 3 | 3 | 3 | 3 | 3 | 3 |

TABLE 1-continued

| Ridge configuration | Straight | Arc (100R) | Straight | Straight | Straight | Straight | Straight | Straight | Straight |
|---|---|---|---|---|---|---|---|---|---|
| Sidewall appearance [Score] | 100 | 100 | 102 | 110 | 110 | 110 | 110 | 105 | 105 |
| Visibility of trademarks [Score] | 100 | 100 | 98 | 98 | 100 | 98 | 95 | 100 | 100 |

| | Ex. 7 | Ex. 8 | Ex. 9 | Ex. 10 | Ex. 11 | Ex. 12 | Ex. 13 | Ex. 14 | Ex. 15 |
|---|---|---|---|---|---|---|---|---|---|
| Radius Ra of curvature of serration pattern area (mm) | 65 | 65 | 65 | 65 | 65 | 65 | 65 | 65 | 65 |
| Minimum pitch α1 of first group (deg.) | 0.2 | 0.4 | 0.3 | 0.3 | 0.3 | 0.3 | 0.3 | 0.2 | 0.3 |
| Maximum pitch α2 of first group (deg.) | 0.4 | 0.6 | 0.6 | 0.5 | 0.5 | 0.5 | 0.7 | 0.6 | 0.4 |
| Difference αh of adjacent pitches (deg.) | 0.1 | 0.1 | 0.15 | 0.1 | 0.1 | 0.2 | 0.1 | 0.08 | 0.1 |
| Inclination angle θb of ridges (deg.) | 0 | 0 | 0 | 5 | 10 | 0 | 0 | 0 | 0 |
| The number of pitch kinds | 3 | 3 | 3 | 3 | 3 | 2 | 5 | 6 | 2 |
| Ridge configuration | Straight | Straight | Straight | Straight | Straight | Straight | Straight | Straight | Straight |
| Sidewall appearance [Score] | 108 | 110 | 110 | 108 | 105 | 105 | 110 | 108 | 105 |
| Visibility of trademarks [Score] | 100 | 95 | 95 | 100 | 100 | 98 | 95 | 100 | 100 |

The invention claimed is:

1. A pneumatic tire comprising
a pair of sidewall portions, at least one of said sidewall portions provided with a serration pattern on its outer surface,
said serration pattern comprising a plurality of radially extending ridges arranged in a circumferential direction of the tire, said serration pattern including a plurality of first groups repeatedly arranged in the circumferential direction of the tire, and
said each first group formed with a plurality of ridges, wherein at least three pitches defined between directly adjacent ridges are present within said first group and said pitches are different from one another so as to increase gradually toward a first circumferential direction of the tire, and wherein a region provided with said serration pattern on said outer surface of the sidewall portion has a radius of curvature in a range of not more than 70 mm in a cross section including a tire axis under a standard condition such that the tire is mounted on a standard rim and inflated to a standard pressure, but no tire load is loaded.

2. The tire according to claim 1, wherein
each said pitch between two ridges is identified as a central angle between two tire-radii which pass said two ridges, viewed from a side of the tire,
said first group includes a minimum pitch of said pitches in a range of from 0.2 to 0.3 degrees and a maximum pitch of said pitches in a range of more than 0.3 degrees but not more than 0.6 degrees, and
the difference between adjacent pitches in said first group is in a range of from 0.07 to 0.14 degrees.

3. The tire according to claim 1,
wherein each of said ridges has an inclination angle in a range of not more than 5 degrees with respect to a radial direction of the tire.

4. The tire according to claim 1,
wherein said outer surface of the sidewall portion is formed of a sidewall rubber element having a thickness in a range of not more than 2.5 mm at a tire maximum-width position under the standard state, and
said serration pattern is provided in an area including the tire maximum-width position.

5. The tire according to claim 1,
wherein the tire further comprises
a pair of bead portions each with a bead core therein and
a carcass comprising at least one carcass ply which comprises a main portion extending between bead cores and a pair of turn-up portion each turned up around the bead core from axially inside to outside of the tire, and
radially outer ends of turn-up portions are positioned axially inside said serration pattern between a radially outer end and a radially inner end of the ridges.

6. The tire according to claim 5,
wherein radially outer ends of turn-up portions are located radially outward of a tire maximum-width position of the tire under the standard state.

7. The tire according to claim 1,
wherein an area of the outer surface of said serration pattern has a central angle in a range of not less than 40 degrees.

* * * * *